May 3, 1938.   H. HEFTY   2,116,311
GARBAGE RECEPTACLE
Filed May 22, 1935
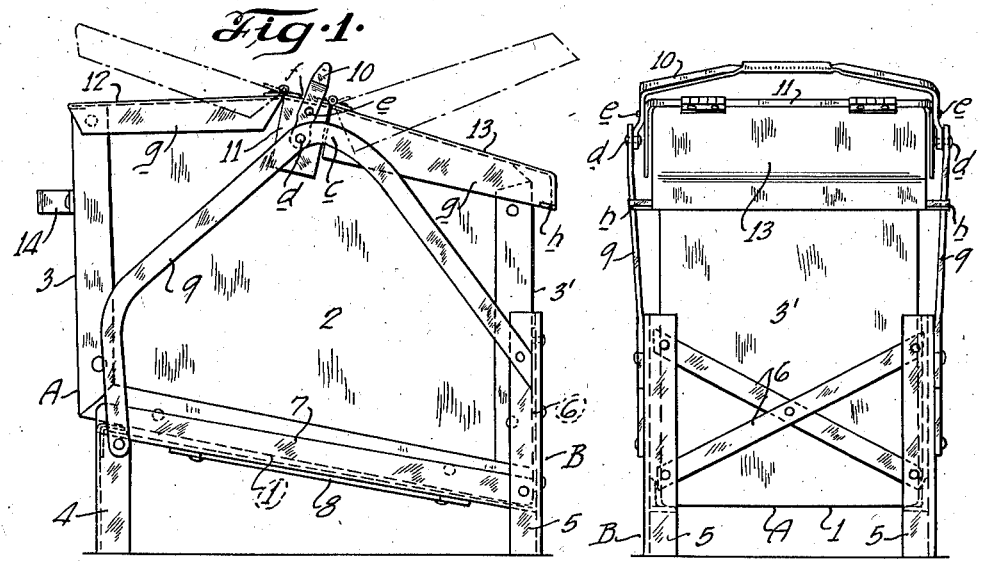
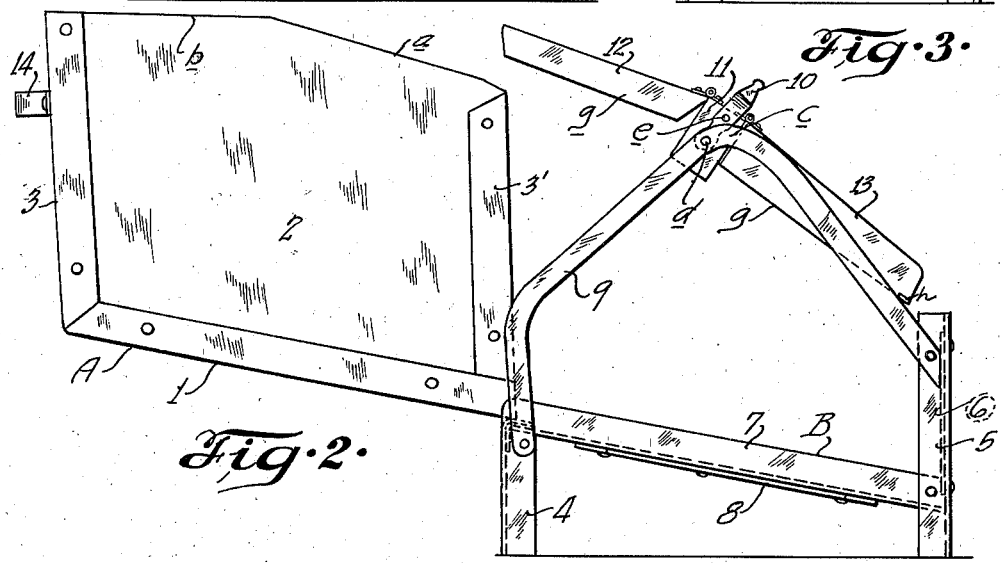
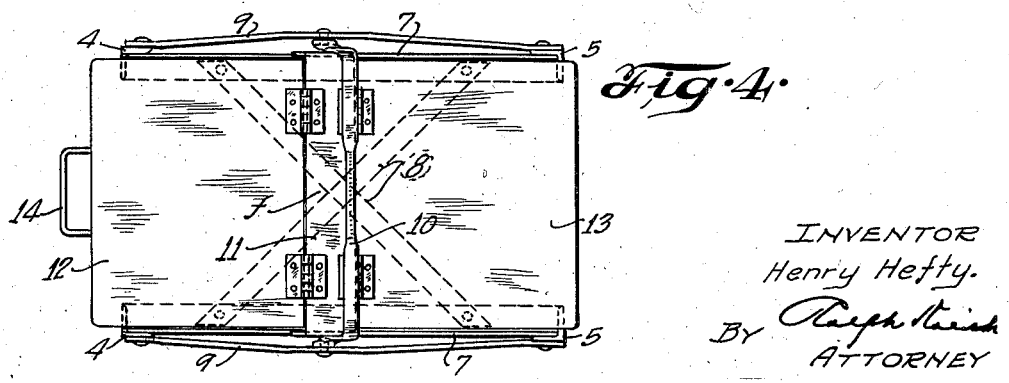
INVENTOR
Henry Hefty.
BY
ATTORNEY Patented May 3, 1938

2,116,311

UNITED STATES PATENT OFFICE 2,116,311

GARBAGE RECEPTACLE

Henry Hefty, St. Louis, Mo.

Application May 22, 1935, Serial No. 22,717

3 Claims. (Cl. 248—134)

This invention relates generally to containers or receptacles and, more particularly, to a certain new and useful improvement in receptacles especially adapted for the temporary storage of garbage, refuse, and the like.

My invention has for its chief object the provision of a receptacle for the purpose stated which contemplates a containing-shell proper, a stand for the shell, and shell cover-members or lids all so co-operably constructed that the shell is freely shiftable in and relatively to the stand with a total elimination of any manual or other such engagement or manipulation of the shell-lids, the latter pivoting automatically, as it may be said, thereby permitting the lids to rest normally in shell-closing position when the shell is positioned in the stand and correspondingly permitting the lids to pivot and become disengaged from the shell responsive to withdrawal of the shell from the stand.

My invention has for another object the provision of a receptacle of the type and for the purpose stated which is inexpensive and durable in structure, which is conveniently usable, and which is efficient in the performance of its intended functions.

And with the above and other objects in view, my invention resides in the novel features of form, construction, arrangement, and combination of parts presently described and pointed out in the claims.

In the accompanying drawing,—

Figure 1 is a side elevational view of a garbage-receptacle or container embodying my invention, the shell or receptacle proper being fully closed and in fully seated or normal position in its supporting stand;

Figure 2 is a similar view of the structure, illustrating the shell or receptacle proper fully open and in withdrawn position from its supporting stand; and Figures 3 and 4 are, respectively, end and plan views of the structure, with the shell, in each instance, in normal seated position.

Broadly, my invention contemplates the provision of a stand, a receptacle or a shell freely positionable within the stand and a lid member for closure-wise engagement on the receptacle when the receptacle is positioned in the stand, the lid being pivotally mounted in the stand about an axial line spaced forwardly from the center of gravity of the lid, so that the lid will have a so-called "heavy-end" resting upon the rear portion of the receptacle, which heavy-end will tend to pivot downwardly as the receptacle is withdrawn from the stand, thereby automatically moving the forward end of the lid upwardly and out of closure-wise engagement with the receptacle. My invention also preferably contemplates the provision of stop-members either on the frame or the lid for limiting the pivotal motion of the lid when the receptacle is removed so as to hold the lid in its position of disengagement in order to permit the receptacle to be replaced in the frame in such a manner that the receptacle will, upon its return movement into the frame, engage the rear or "heavy-ended" portion of the lid and cause the lid to pivot reversely responsive to the returning movement of the receptacle, thereby bringing the lid again into closure-wise engagement with the receptacle.

Referring now more in detail and by reference characters to the drawing, which illustrates a preferred embodiment of my invention, A designates the receptacle or container proper, which is preferably, as shown, in the form of an open-top approximately rectangular box-like shell constructed of sheet-metal or other suitable material, and which comprises a base or bottom wall 1 and upstanding side and end walls 2, 2, and 3, 3', all suitably flanged and riveted or otherwise permanently fixed together. For purposes presently appearing, the walls of shell A are so relatively shaped and proportioned that the base wall 1 thereof has a permanent bevel, slope, or inclination downwardly from the front to the rear of the shell, the rear wall 3' being of somewhat reduced height relatively to front wall 3, the front wall 3 inclining slightly outwardly or forwardly from its lower to its upper margin, and the side walls 2 having a top or upper margin which inclines downwardly from the front wall 3 to the rear wall 3' with approximately the rear half $a$ thereof being of greater downward inclination than the remaining approximate front half $b$ thereof.

Co-operable with shell A, is a stand or support B, which is of skeleton formation and includes a pair of relatively short upstanding rigid parallel strip-like front legs or posts 4, 4, and a pair of somewhat longer upstanding rigid rear legs or corner posts 5, 5, the latter being preferably of angular form in section and rigidly secured in spaced parallel relation by cross-braces or strips 6.

Riveted or otherwise permanently fixed to, and joining, the front and rear legs 4, 5, are longitudinal members or rails 7 preferably rigidly braced by additional cross-members or strips 8, the rails 7 being also preferably of angle-form with their angles presented inwardly.

Having their respective ends riveted or otherwise fixed, as shown, to the front and rear legs or posts 4, 5, and forming part of the stand B, are side members in the form preferably of registering flat-strips 9 shaped or contoured, as shown, to include an intermediate hump c, as it may be termed, disposed approximately midway the front and rear legs 4, 5, and pivotally attached at its opposite flanged ends, as at d, to the side strips 9 at a point disposed or offset somewhat forwardly and downwardly from the apex of the hump c, is a bail 10. The so-connected legs 4 and 5, rails 7, and side members or strips 9 provide an enclosure-forming frame for accommodating the shell A, and, as shown, the rails 7 have the same rearward and downward inclination or slope as that of the bottom-wall 1 or shell A and provide a slide-way for conveniently seating the shell A within the chamber of the stand B. It may be stated that the legs 5 are spaced one from the other a distance approximately equal to the width of shell A and have their angles presented inwardly for snugly engaging and embracing the opposite rear corners of shell A when the latter is in normal seated position within the frame of the stand B, as best seen in Figure 1.

The bail 10 forms part of a shell closure-structure, also forming part of which and disposed within the confines of the bail 10, is an approximately U-shaped metallic section or member 11 whose legs are presented downwardly and pivotally attached, as at e, to the flanged ends of bail 10, and whose central portion or bight f forms a partial cover or lid for the shell A when the latter is in normal seated position in the stand B, as best seen in Figure 4.

Also forming part of the shell closure-structure and hinged or otherwise pivotally attached, as shown, at their respective rear margins to the front and rear margins of the central portion f of cover-section 11, are front and rear shell-lids or covers 12, 13, respectively, each preferably downwardly flanged along its opposite side margin, as at g, the rear lid 13 being preferably larger and heavier than the front lid 12, so that the entire lid or closure structure will normally tend to pivot under the weight of the rear lid 13, during which pivotal action the rear lid will move downwardly into the frame and the front lid will correspondingly move upwardly and out of engagement with the receptacle.

As shown in Figures 1, 3, and 4, the shell A and support or stand B are so relatively proportioned that the shell A, when in garbage-receiving or normal position, snugly seats within the frame of the stand and upon the rails 7 and its open top is completely covered and closed by the opposed lids 12, 13, and the intermediate pivoted section 11, one or the other or both the lids 12, 13, however, being freely swingable for the depositing of garbage or the like within the seated shell A.

To empty the shell A, the same is forwardly shifted relatively to and removed from the stand B, as shown in Figure 2, for which purpose a hand-grip 14 is conveniently provided on the shell front-wall 3. Since the heavier rear lid 13 rests upon the top edge of the receptacle, it will be apparent that, as the receptacle is removed from the frame, the receptacle will likewise be removed from supporting engagement with the under side of the lid 13, whereupon the lid 13 will move downwardly, as above described, carrying with it the entire lid structure and consequently causing the front lid 12 to move upwardly out of closure-wise engagement with the receptacle or shell A. On such removal of the shell A, the lids 12, 13, due to the offset pivoting of their supporting-section 11, take the rearwardly and downwardly inclined position illustrated in Figure 2, with the front lid 12 obliquely raised out of obstructing relation to a reseating of the shell A and the rear lid 13 endwise projecting into the frame or stand B. Hence, the shell A, being emptied, may be easily and freely reseated in normal position within the frame or the stand B. However, in such operation, the rear lid 13 is engaged by the oblique rear top marginal portions of the respective shell side walls 2. Thus, as the shell A is reseated, the closure-structure is reversely swung, the rear lid 13 engaging in closure-position with the shell, and front lid 12 being consequently pivotally lowered to rest on the shell A, both lids 12, 13 taking their full shell-closing positions when the shell A is again fully seated in normal position in the stand B.

It will be evident that, upon removal of the shell A from the stand B, the withdrawal of the lids 12, 13, from closurewise position is entirely automatic, so that even when the shell A is in closure position, the lids 12, 13, will in no respect prevent the removal or unseating of the shell A and, on the other hand, when the shell A has been removed from the stand B, the lids 12, 13, will in no respect prevent restoration of the shell A to closure-wise position in the stand B. As best seen in Figure 2, the rear lid 13 is provided with lateral fingers h for engagement with the side-members 9 for limiting the downward swinging movement of the lids 12, 13, when the shell A is unseated or removed from the stand B.

The structure is especially designed for household use, is highly sanitary, entirely eliminates any loss or misplacement of the shell lid or lids, and fulfills in every respect the objects stated, and it is to be understood that changes and modifications in the form, construction, arrangement, and combination of the several parts of the structure may be made and substituted for those herein shown and described without departing from the nature and principle of my invention.

Having thus described my invention, what I claim and desire to secure by Letters Patent is,—

1. In combination, a stand having a guide-way therein for removably seating and accommodating a receptacle-shell, a receptacle-shell for removably seating on said guide-way and within said stand, and a shell-closure structure including a cross-member pivotally mounted on the stand and a pair of opposed lids hingedly mounted on the cross-member for upward and swingable movement relative to the central member for normally fitting over the shell in closure-forming engagement with the upper marginal portions thereof when seated in the stand, said shell-closure structure being automatically maintained in closure-forming position by the shell and being adapted for pivotal movement out of closure-forming position upon removal of the shell, said shell being engageable with said shell-closure structure upon return movement of the shell into the stand for reversely swinging the lids into normal shell closure-position.

2. In combination, a stand including a slide-way and a pair of spaced side-members upstanding from the slide-way for removably seating and accommodating a receptacle-shell, a receptacle-shell for removably seating on said way and within said stand, and a shell-closure structure comprising a bail extending transversely over the slide-way and having pivoted connection with said side-members, a cross-member also extending transversely over the slide-way and having pivoted connection with the bail, and a pair of opposed lids each having hinged connection with the cross-member for normally fitting over the seated shell, said structure being automatically maintained in closure-forming position by the shell and being adapted for pivotal movement out of closure-forming position upon removal of the shell, said shell being engageable with said structure upon return movement of the shell into the stand for reversely swinging the lids into normal shell closure-position.

3. A garbage receptacle comprising a skeleton-frame having an open front for receiving a flat-bottomed flat-sided container-shell, said frame also having an inclined bottom sloping downwardly away from the front portion thereof, a cross-frame pivotally mounted transversely across the upper portion of the frame at a point substantially in a vertical line passing through the center of gravity of the frame when the shell is in position, said cross-frame having a handle member mounted thereon, and a pair of opposed upwardly swingable lids for closure-wise engagement respectively with the forward and rearward top portions of the shell, said rearward closure-forming member being substantially heavier than the forward member for causing the entire cross-frame and associated closure structures to pivot on the frame as the shell is removed.

HENRY HEFTY.